UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PROCESS OF MAKING AN ANTHRACENE DYE.

No. 844,914.　　　　Specification of Letters Patent.　　　Patented Feb. 19, 1907.

Application filed December 4, 1905. Serial No. 290,247.

*To all whom it may concern:*

Be it known that I, RENÉ BOHN, doctor of philosophy and chemist, a citizen of the Swiss Republic, residing at Mannheim, in the Grand Duchy of Baden, German Empire, have invented new and useful Improvements in Processes of Making an Anthracene Dye, of which the following is a specification.

In the specifications of Letters Patent Nos. 739,579 and 753,659 are described methods for the production of halogen derivatives of indanthrene, and it is there stated that these coloring-matters are very fast against the action of chlorin.

I have now discovered that by heating indanthrene with antimony pentachlorid in the presence of a suitable solvent—such, for instance, as nitrobenzene—a chlorin derivative of indanthrene can be obtained which possesses all the properties attributed to the coloring-matter described and claimed in the aforesaid specification of Letters Patent No. 739,579, but when prepared according to the process of the present invention yields dyeings which are still faster against the action of chlorin.

The following example will serve to further illustrate the nature of my invention and the way in which it can be carried into practical effect; but my invention is not confined to this example. The parts are by weight.

Boil together for one (1) hour one (1) part of indanthrene, ten (10) parts of nitrobenzene, and three (3) parts of antimony pentachlorid and allow the mixture to cool slowly. The new chlorin derivative of indanthrene in the form of the azin separates out in green needles. Filter these off and wash them with a little nitrobenzene and then with alcohol and ether.

Now what I claim is—

1. The process of making a chlorin derivative of indanthrene by heating indanthrene with antimony pentachlorid in the presence of a suitable solvent.

2. The process of making a chlorin derivative of indanthrene by heating indanthrene with antimony pentachlorid in the presence of nitrobenzene.

In testimony whereof I have hereunto set my hand in the presence of two subscribing witnesses.

RENÉ BOHN.

Witnesses:
　J. ALEC. LLOYD,
　JOS. H. LEUTE.